United States Patent
Kim et al.

(10) Patent No.: US 9,710,976 B2
(45) Date of Patent: Jul. 18, 2017

(54) SYSTEM AND METHOD FOR TRANSMITTING DATA OF A VEHICLE

(71) Applicant: HYUNDAI MOTOR COMPANY, Seoul (KR)

(72) Inventors: Sung Yun Kim, Seoul (KR); Chul Min Kim, Suwon-si (KR); Jae Am Seo, Seongnam-si (KR); Young Su Kim, Yongin-si (KR); Min Wook Seo, Suwon-si (KR); Hyeon Soo Kim, Suwon-si (KR); Dong Youl Lee, Yongin-si (KR); Si Jun Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 140 days.

(21) Appl. No.: 14/568,053

(22) Filed: Dec. 11, 2014

(65) Prior Publication Data
US 2015/0348336 A1    Dec. 3, 2015

(30) Foreign Application Priority Data

Jun. 3, 2014 (KR) .................. 10-2014-0067706

(51) Int. Cl.
*H04L 29/08* (2006.01)
*G07C 5/00* (2006.01)
(52) U.S. Cl.
CPC .............. *G07C 5/008* (2013.01); *H04L 67/10* (2013.01); *H04L 67/12* (2013.01); *H04L 67/322* (2013.01)

(58) Field of Classification Search
None
See application file for complete search history.

(56) References Cited

U.S. PATENT DOCUMENTS

| 2010/0185356 A1* | 7/2010 | Haas | G07C 5/085 |
| | | | 701/31.4 |
| 2011/0131319 A1* | 6/2011 | Harrang | H04L 47/11 |
| | | | 709/224 |
| 2012/0105637 A1 | 5/2012 | Yousefi et al. | |
| 2013/0254323 A1* | 9/2013 | Bhalerao | H04L 67/2852 |
| | | | 709/213 |

FOREIGN PATENT DOCUMENTS

| KR | 10-0812455 B1 | 3/2008 |
| KR | 10-2012-0040469 A | 4/2012 |
| KR | 10-2013-0028554 A | 3/2013 |
| KR | 10-2013-0049633 A | 5/2013 |
| KR | 10-2013-0086363 A | 8/2013 |
| KR | 10-2013-0140278 A | 12/2013 |

* cited by examiner

*Primary Examiner* — Angela Nguyen
(74) *Attorney, Agent, or Firm* — McDermott Will & Emery LLP

(57) ABSTRACT

A system and a method are provided for transmitting data of a vehicle for efficiently managing a server or a communications network by at least a communications network infrastructure by determining a first list of priorities of vehicle information by a second server, transmitting the first list of priorities to a first server, comparing the transmitted first list of priorities of the vehicle information with traffic data to generate a second list of priority information, and informing the second server and a computing device of the vehicle of the generated second list of priority information.

6 Claims, 4 Drawing Sheets

SYSTEM AND METHOD FOR TRANSMITTING DATA OF A VEHICLE

CROSS-REFERENCE TO RELATED APPLICATION

This application is based on and claims the benefit of priority to Korean Patent Application No. 10-2014-0067706, filed on Jun. 3, 2014 in the Korean Intellectual Property Office, the disclosure of which is incorporated herein in its entirety by reference.

TECHNICAL FIELD

The present disclosure relates to a system and a method for transmitting data of a vehicle, and more particularly, to a technology for managing a communications network for efficiently transmitting massive data of the vehicle.

BACKGROUND

In general, it is very important for a vehicle system to transmit and receive data to control a safety driving of the vehicle.

Particularly, in the case in which an emergency situation occurs, it is required to quickly and accurately transmit emergency data in order to quickly cope with the emergency situation.

An example of the transmission of the emergency data has been disclosed in Korean Patent No. 0812455. The above-cited Korean Patent relates to a car information transmission control system, which includes a communicator configured for directly communicating with one or more other vehicles and a determiner for determining a position of a vehicle. The communicator, which is connected to the determiner and other devices mounted in the vehicle via a vehicle network, obtains information of the vehicle, and then transmits the obtained information to other vehicles to thereby control the number of times or an interval of transmitting the information to other vehicles. The obtained information includes identification information indicating importance or urgency.

That is, the communicator, which is connected to other devices mounted in the vehicle, obtains the information of the vehicle, and then transmits the obtained information to other vehicles. Moreover, the communicator differently controls the transmission number of times, the transmission interval, and the like of the same information depending on importance, urgency, and the like of the information, such that information having high importance and urgency may be more accurately transmitted and an inefficient increase in a communications load may be prevented in advance.

However, the above-cited Korean Patent may accurately transmit the information having the high importance and urgency by differently controlling the transmission number of times, the transmission interval, and the like, but because it does not quickly perform information transmission, it does not quickly cope with a quick emergency service when the quick emergency service, or the like is required.

Particularly, a transmission method of emergency data according to the related art adopts a scheme of transmitting data at the same priority without priority in the data in transmitting the data (or messages) from a vehicle to a control center. Therefore, in the case in which apparatuses of the vehicle transmit massive data such as image contents, camera image data, or the like, although the emergency situation occurs, the emergency data may be transmitted after being sequentially awaited according to priorities of tasks or the emergency data may be transmitted late in time due to a priority transmission of data that is first stored in a data transmission block Accordingly, there exists a need for a system that resolves the above-mentioned data transmission problems occurring in an emergency situation.

SUMMARY

Disclosed herein is a system and method for transmitting data of a vehicle in a timely prioritized manner.

In accordance with an exemplary aspect of the present disclosure. a system and a method for transmitting data of a vehicle is configured for efficiently managing a server or a communications network by at least a communications network infrastructure by determining priorities of vehicle information by a second server, transmitting a list of priorities to a first server, comparing the transmitted priorities of the vehicle information with traffic data to generate final priority information, and informing the second server and the vehicle of the generated final priority information. According to another exemplary aspect of the present disclosure, a system for transmitting data of a vehicle includes: a first server configured to receive a priority list of vehicle information of the vehicle from a second server and generate a final priority list by taking account of the priority list of the second server and a current traffic of data.

In another aspect, the first server may transmit a final priority to the vehicle and the second server.

In another aspect, the first server may include a data transceiver, a data scheduler, a priority transceiver, and a priority determiner.

In another aspect, the second server may variably adjust the priority of the vehicle information by taking account of emergency, waiting time, frequency, and priority strength.

In another aspect, the emergency may have the priority determined in the order of accident data, failure data, diagnosis data, and driving data.

In another aspect, the server may include a data transceiver, a data scheduler, a priority transceiver, and a priority determiner.

In another aspect, the vehicle and the second server may transmit and receive the data to and from each other according to the final priority.

According to another exemplary aspect of the present disclosure, a method for transmitting data of a vehicle includes: receiving a priority list of vehicle information of the vehicle from a second server; generating a final priority list by taking account of the priority list of the second server and a current traffic; transmitting the final priority list to the vehicle and the second server; and transmitting and receiving selected vehicle data to and from each other between the vehicle and the second server.

In another aspect, the second server may variably adjust the priority of the vehicle information by taking account of emergency, waiting time, frequency, and priority strength.

In another aspect, the emergency may have the priority determined in the order of accident data, failure data, diagnosis data, and driving data.

BRIEF DESCRIPTION OF THE DRAWINGS

The above and other objects, features and advantages of the present disclosure will be more apparent from the following detailed description taken in conjunction with the accompanying drawings

DETAILED DESCRIPTION

The above-mentioned objects, features, and advantages will become obvious from the detailed description which is described below in detail with reference to the accompanying drawings Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make unclear the gist of the present disclosure, it will be omitted. Hereinafter, exemplary implementations of the present disclosure will be described in detail with reference to the accompanying drawings.

Figure 1:
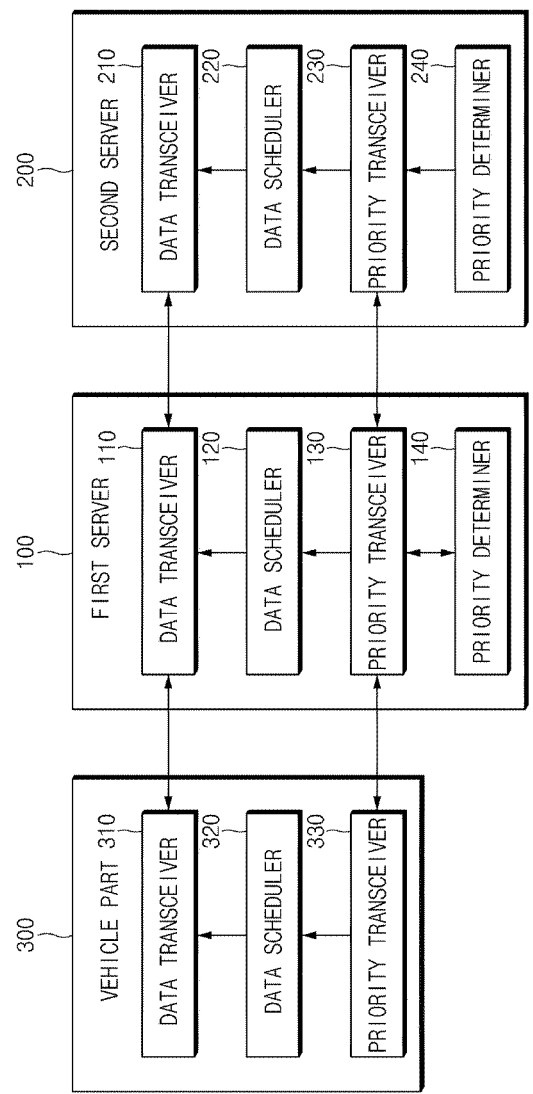
FIG. 1 is a configuration diagram illustrating a system for transmitting data of a vehicle according to an exemplary implementation of the present disclosure.

FIG. 1 is a configuration diagram illustrating a system for transmitting data of a vehicle according to an exemplary embodiment of the present disclosure.

Referring to FIG. 1, the system for transmitting the data of the vehicle includes a first server 100, a second server 200, and a vehicle part 300.

The first server 100 may be a server of a communication company, and associated with a communications network, or with a network managing massive data of the vehicle, and include a data transceiver 110, a data scheduler 120, a priority transceiver 130, and a priority determiner 140.

The data transceiver 110 is configured to transmit and receive data to and from a data transceiver 210 of the second server 200 and a data transceiver 310 of the vehicle part 300.

The data scheduler 120 is configured to control a transmission and a reception of the data according to a priority determined by the priority determiner 140.

The priority transceiver 130 is configured to transmit and receive a priority list to and from a priority transceiver 230 of the second server 200 and a priority transceiver 330 of the vehicle part 300.

The priority determiner 140 is configured to determine a variable priority (a final priority) in real time by taking into account a priority list of the second server 200 and a current traffic situation. Moreover, the final priority may be generated by taking into account the priority list of the second server 200 and the current traffic situation, and may also be generated by taking into account all of the priority list of the second server 200, the priority list of the first server 100, and the current traffic situation.

The second server 200 may be a server, and may be associated with a communications network, or with a network managing massive data of the vehicle, and include a data transceiver 210, a data scheduler 220, a priority transceiver 230, and a priority determiner 240. Moreover, the massive data of the vehicle may be referred to as big data of the vehicle.

The data transceiver 210 is configured to transmit and receive data to and from the data transceiver 110 of the first server 100 and the data transceiver 310 of the vehicle part 300.

The data scheduler 220 is configured to control the transmission and reception of the data according to the priority determined by the priority determiner 240.

The priority transceiver 230 is configured to transmit and receive the priority list to and from the first server 100.

The priority determiner 240 is configured to determine a variable priority by taking account of data transmitted and received to and from the vehicle parts 310 of a plurality of vehicles and data transmitted and received to and from a plurality of servers.

The vehicle part 300 includes a data managing system of the vehicle and includes a data transceiver 310, a data scheduler 320, and a priority transceiver 330.

The data transceiver 310 is configured to transmit and receive data to and from the data transceiver 110 of the first server 100 and the data transceiver 210 of the second server 200.

The data scheduler 320 is configured to control the transmission and reception of the data according to the received priority list.

The priority transceiver 330 is configured to transmit and receive the priority list to and from the priority transceiver 130 of the first server 100.

Figure 2:
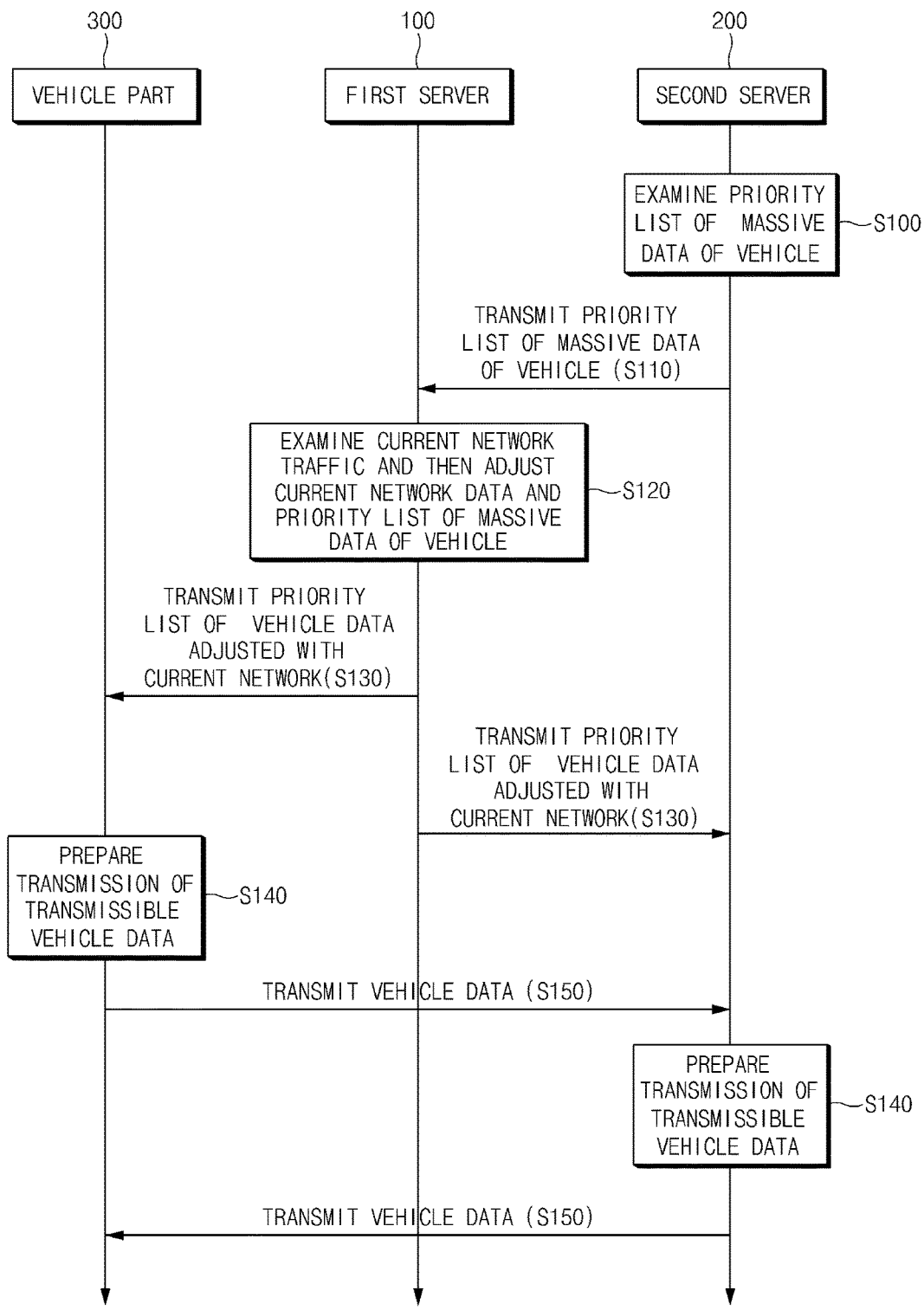
FIG. 2 is a flowchart illustrating an operation method of a system for transmitting data of a vehicle according to an exemplary implementation of the present disclosure.

FIG. 2 is a flowchart illustrating an operation method of a system for transmitting data of a vehicle according to an exemplary implementation of the present disclosure.

Referring to FIG. 2, the second server 200 examines a priority list of vehicle information (S100). In accordance with the present disclosure, the vehicle information may include the massive data of the vehicle and may include various kinds of data in addition to the massive data.

Specifically, the second server 200 may receive data from a plurality of vehicles or a plurality of servers, and determine the priority according to a kind of data of the vehicle to thereby generate the list The data of the vehicle may variably adjust the priority thereof by taking into account emergency and the like. For example, the kind of data may include various kinds such as accident data, failure data, map data, speed data, or vehicle diagnosis data and the like.

Specifically, the second server 200 may generate the priority by calculating the priority according to emergency, waiting time, frequency, and priority strength. In accordance with the present disclosure, the emergency includes an emergency index according to data, the waiting time includes data having a high waiting time index among data having the same emergency, the frequency includes the number of times that a plurality of vehicles issue the same kind of data, and the priority strength includes data capable of being forcedly transmitted and received among the massive data of the vehicle other than priority of the emergency, the waiting time, and the frequency. When the priority as mentioned above is calculated using the following equation:

$$\text{Priority} = f(\text{Emergency, Waiting Time, Frequency and Force}) \text{ or } (\text{Emergency} \times \text{Waiting Time} \times \text{Frequency} \times \text{Force})$$

At Step S110, the second server 200 transmits the priority list of the massive data of the vehicle to the first server 100 after examining the priority list of the massive data of the vehicle.

At Step S120, the first server 100 examines a current traffic situation of data and then compares the current traffic situation of the data with the received priority list of the massive data of the vehicle to thereby generate a final priority list. Moreover, the current traffic situation of the data may be detected in real time by using an existing communications network At Step S130, the first server 100 transmits the final priority list to the second server 200 and the vehicle part 300, respectively) after generating the final priority list and then.

At Step S140, the second server 200 and the vehicle part 300 each prepare transmissible vehicle data according to the final priority list, and transmit and receive the transmissible vehicle data to and from each other, at Step S150.

Figure 3:
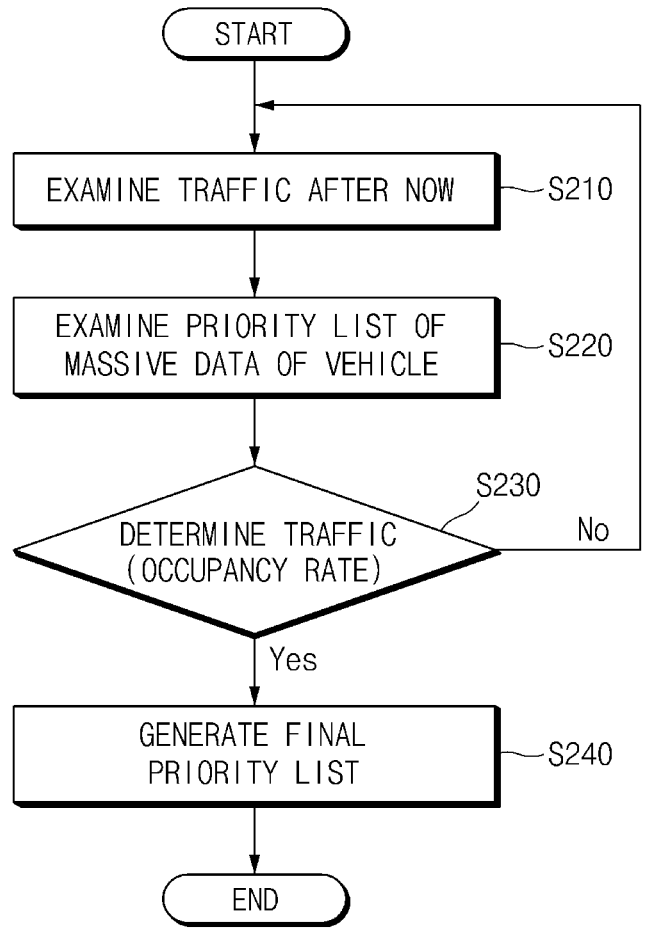
FIG. 3 is a flowchart illustrating a method for determining priority of a first server according to an exemplary implementation of the present disclosure.

FIG. 3 is a flowchart illustrating a method for determining priority of a first server according to an exemplary implementation of the present disclosure.

Referring to FIG. 3, at Step 210, the first server continuously examines and updates the traffic situation from now. Moreover, the traffic situation may include an amount of data transmitted and received between the vehicle and the server or the communications network and include traffic jam information of the vehicle.

At Step S220, the first server examines the priority list of the massive data of the vehicle received from the second server.

At Step 230, the first server compares and determines the priority list of the massive data of the vehicle with the current traffic situation.

For example, if the current traffic situation is high as compared to the priority list of the massive data of the vehicle, the first server is configured to transmit only data having the priority selected as a first rank and a second rank to the vehicle part and the second server. Moreover, a case in which the traffic situation is high may be a case in which throughput transmitting and receiving the vehicle data is large or an amount of massive data of the vehicle is large.

However, if the current traffic situation is low as compared to the priority list of the massive data of the vehicle, the first server is configured to transmit data having the priority from a first rank to a fourth rank to the vehicle part and the second server. In the case in which the traffic situation is low, several kinds of data may be processed or the data processing is not interrupted, transmission rate between data may be high and stable.

In addition, if the current traffic situation is ranked in a middle level as compared to the priority list of the massive data of the vehicle, the first server is configured to transmit data having the priority from a first rank to a fourth rank to the vehicle part and the second server. Moreover, in the case in which the traffic situation is ranked in the middle level, the transmission rate between data may be low and unstable.

At Step S240, the first server is configured to generate the final priority list after comparing and determining the priority list of the massive data of the vehicle with the current traffic situation.

Figure 4:
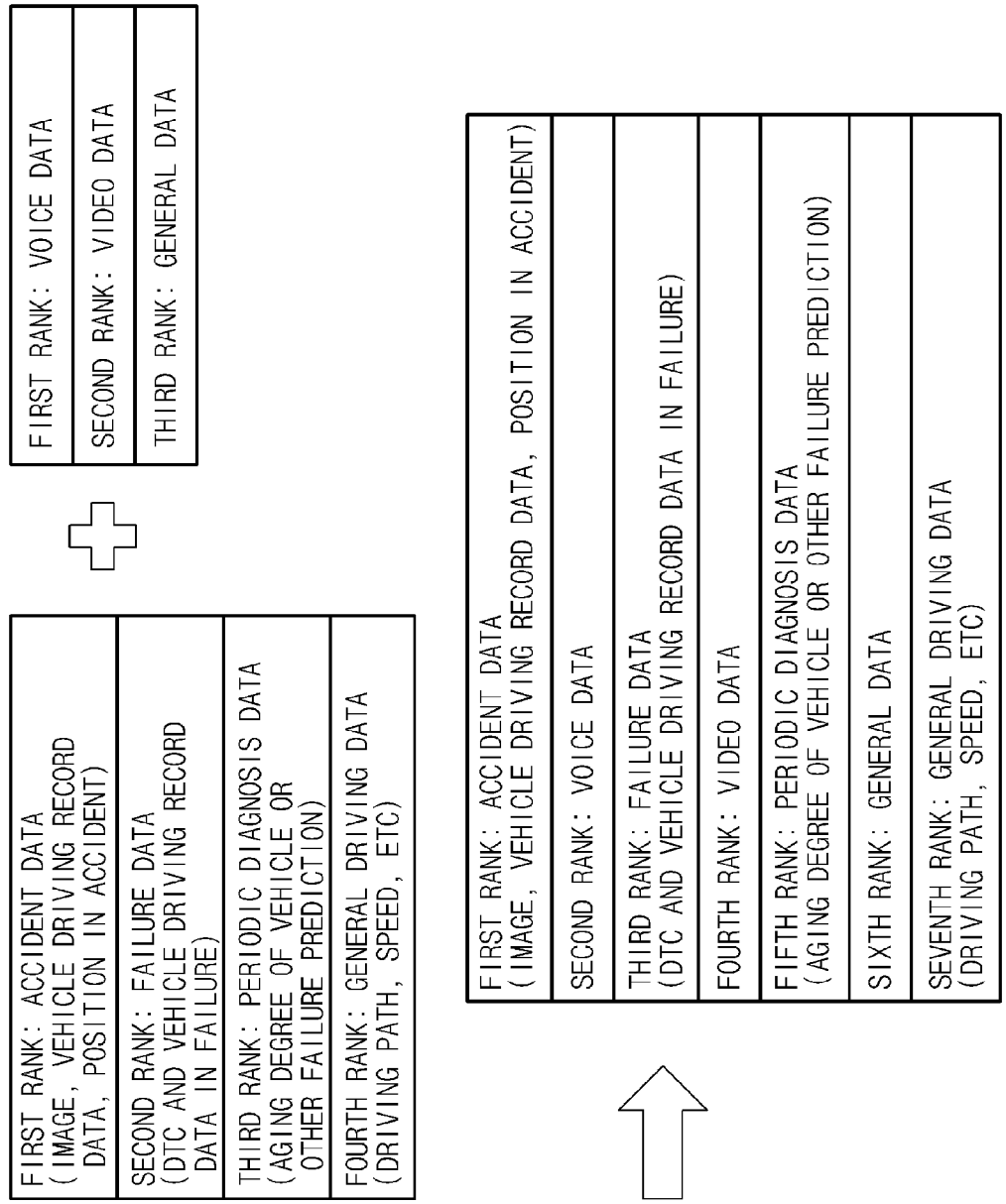
FIG. 4 is a diagram illustrating a method for determining final priority according to an exemplary implementation of the present disclosure.

FIG. 4 is a diagram illustrating a method for determining final priority according to an exemplary implementation of the present disclosure.

Referring to FIG. 4, the final priority list of the first server may be generated by taking into account the priority of the second server and the current traffic situation. In addition, the final priority list of the first server may be generated by taking into account all of the priority of the second server, the priority of the first server, and the current traffic situation. Moreover, since the current traffic situation is variable, it is not considered.

For example, when the second server is classified into a first rank of accident data, a second rank of failure data, a third rank of diagnosis data, and a fourth rank of general driving data, and the first sever is classified into a first rank of voice data, a second rank of video data, and a third rank of general data, the first server is configured to determine the priority of the classified data of the second server and the classified data of the first server to thereby generate the final priority list including the first rank to a seventh rank in the first server.

Therefore, as shown in FIG. 4, the final priority list may classify the accident data into the first rank, the voice data into the second rank, the failure data into the third rank, the video data into the fourth rank, the general data into a fifth rank, and the diagnosis data into a sixth rank, and the general driving data into the seventh rank Specifically, the first rank of the second server has priority over the first rank of the first server and the first rank of the first server has priority over the second rank of the second server.

Further, the second rank of the second server has priority over the second rank of the first server and the second rank of the first server has priority over the third rank of the second server. Designated ranks (only from the first rank to the third rank) among the first rank to the seventh rank may be determined and transmitted to the final priority list by taking account of the current traffic situation. An order of the final priority list may be changed by a driver or a user according to the traffic situation between the vehicle and the server.

As set forth above, according to exemplary implementations of the present disclosure, the server or the communications networks may be efficiently managed by including at least the communications network, and the massive data or the emergency data of the vehicle may be efficiently classified and may be transmitted and received without being delayed.

According to the exemplary implementation of the present disclosure, the server or the communications network may be efficiently managed by at least the communications network infrastructure, the emergency data of the vehicle may be efficiently transmitted without being delayed, and the driver may use the massive data at minimized costs.

Although the present disclosure has been described with reference to exemplary implementations and the accompanying drawings, it would be appreciated by those skilled in the art that the scope of the present disclosure is not limited thereto but various modifications and alterations might be made without departing from the scope defined in the claims and their equivalents.

What is claimed is:

1. A system for transmitting data of a vehicle, the system comprising:
    a first server including a data transceiver communicatively connected to a data transceiver of the vehicle and a data transceiver of a second server, and configured to receive a first priority list of vehicle information of the vehicle via the data transceiver of the first server from the second server and to generate a second priority list by taking into account the first priority list of vehicle information received from the second server and a current traffic data; and
    a vehicle part of the vehicle, the vehicle part configured to receive the second priority list from the first server and prepare transmissible vehicle data according to the second priority list, and to transmit the transmissible vehicle data to the second server,
    wherein the second server is configured to variably adjust the first priority list of the vehicle information by taking into account emergency data, waiting time data, frequency of data communication, and priority strength of data.

2. The system according to claim 1, wherein the first server transmits the second priority list to the vehicle part which comprises a computing device of the vehicle and to the second server.

3. The system according to claim 1, wherein the first server includes a data transceiver, a data scheduler, a priority transceiver, and a priority determiner.

4. The system according to claim 1, wherein the emergency data has a priority determined in an order of accident data, failure data, diagnosis data, and driving data.

5. The system according to claim 1, wherein the second server includes a data transceiver, a data scheduler, a priority transceiver, and a priority determiner.

6. The system according to claim 1, wherein the vehicle part, which comprises a computing device of the vehicle, and the second server transmit and receive data to and from each other according to the second priority list.

* * * * *